March 10, 1970 F. G. TROTT ET AL 3,499,463
ELECTROHYDRAULIC SERVO VALVE
Filed Nov. 20, 1967 2 Sheets-Sheet 1
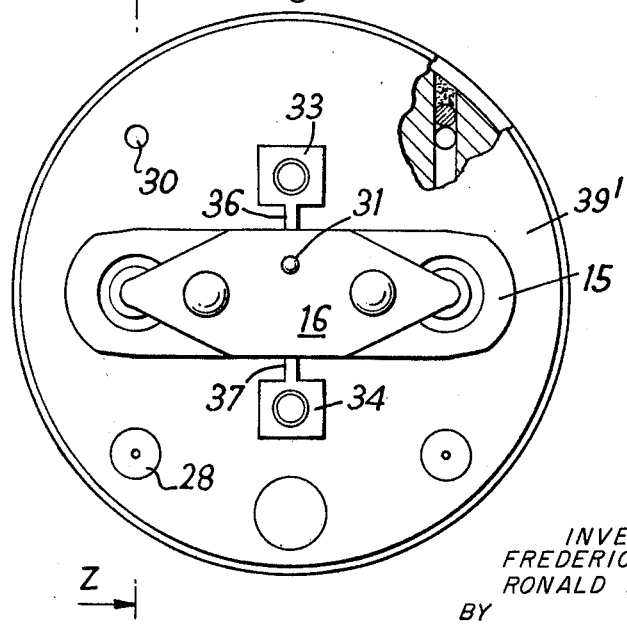
INVENTORS
FREDERICK G. TROTT
RONALD WALTERS
BY
*S. C. Geaton*
ATTORNEY March 10, 1970  F. G. TROTT ET AL  3,499,463
ELECTROHYDRAULIC SERVO VALVE
Filed Nov. 20, 1967  2 Sheets-Sheet 2

INVENTORS
FREDERICK G. TROTT
RONALD WALTERS
BY
S. C. Yeaton
ATTORNEY

United States Patent Office 3,499,463
Patented Mar. 10, 1970

3,499,463
ELECTROHYDRAULIC SERVO VALVE
Frederick George Trott, Northwood, and Ronald Walters, Wembley, England, assignors to Sperry Rand Limited, London, England, a company of Great Britain
Filed Nov. 20, 1967, Ser. No. 684,219
Int. Cl. G05d 16/20; H01f 7/08; F16k 51/00
U.S. Cl. 137—595                    2 Claims

ABSTRACT OF THE DISCLOSURE

The armature of an electrohydraulic servo valve is formed integrally with a pair of oppositely extending arms. The arms are rigidly secured to stationary structure with distance pieces therebetween to set a gap between the armature and the stationary structure. The armature can tilt by torsional deformation of the arms.

---

This invention relates to electrohydraulic servo valves or valve stages of the kind wherein electromagnet means when energised causes tilting motion of an armature, the motion causing an hydraulic power line or lines to be opened or closed. Valves of this type will be referred to as "valves of the kind described." The invention is particularly, but not exclusively, concerned with miniature electrohydraulic servo valves or valve stages.

An electrohydraulic servo valve or valve stage of the kind described, wherein the armature has a mounting comprising one or more arms extending therefrom lying adjacent stationary structure of the valve, one or more distance pieces located between the or each arm and the stationary structure to define a gap between the armature and the stationary structure and means rigidly securing the arm and the distance piece to the armature, the or each extension being torsionally deformable to allow tilting of the armature relative to its mounting.

A specific embodiment of electrohydraulic servo valve constructed and assembled according to the invention is shown in the accompanying drawings, in which:

FIGURE 1 is a section through the first stage of a servo valve,

FIGURE 2 is an exterior view from below of the stage of FIGURE 1,

The illustration is of the first stage of a two-stage hydraulic valve, its action being when electrically energised to open one or other of two hydraulic lines which are connected in turn to operate hydraulically a larger second valve stage (not shown). A miniature first stage of overall dimensions about 1 inch x 1 inch x 1 inch is shown on an enlarged scale, but the invention could be applied to larger or smaller valves.

Figure 3:
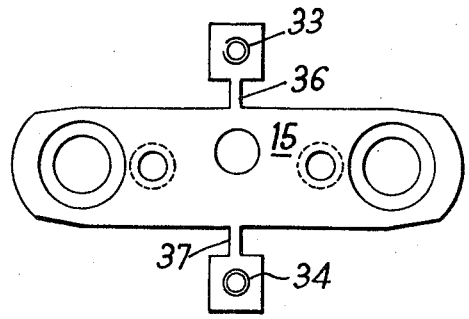
FIGURE 3 is a plan view of an armature forming part of the stage of FIGURE 1.

Referring to the figures, a permanent magnet 11 polarised as shown in FIGURE 1 has its north pole abutting a non-magnetic barrier member 12 which lies adjacent a T-shaped armature 13 of soft iron, for instance Radiometal 50. Armature 13 is formed in two parts rivetted together, a base 15 (shown in more detail in FIGURE 3) and a cross-piece 16, the cross-piece 16 extending from either side of the base at 17 and 18. The surface of the armature facing the barrier is lapped to a flat finish and is positioned as described hereinafter to leave a 0.002 inch air gap between the armature and the barrier.

Figure 4:
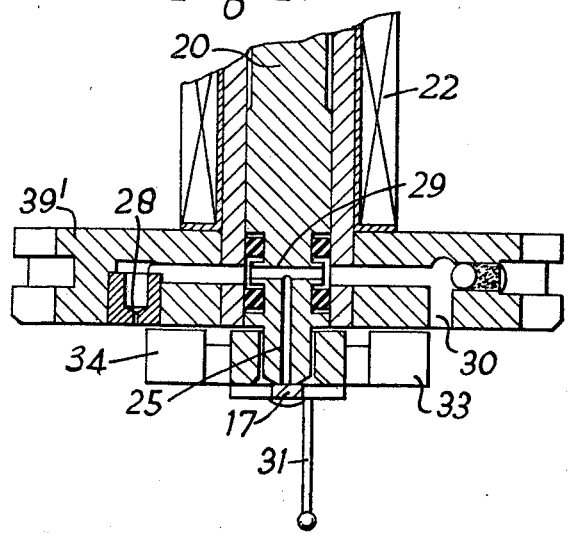
FIGURE 4 is a detail view of part of the section on line Z—Z of FIGURE 2 but reversed.

A pair of adjustable nozzle members 20, 21 have threaded engagement in cylindrical pole pieces 20', 21' positioned one on either side of the permanent magnet 11, each pole piece surrounded by one of a pair of separately energisable coils 22, 23 respectively, and mounted between frame members 39, 39'. Each adjustable nozzle has a passageway 25, 26 an end of which is closed when an extension 17, 18 abuts the end of the nozzle. As shown in detail in FIGURE 4, the passageway 25 communicates with an hydraulic supply line which leads pressurized fluid away from the second stage valve (not shown), the line including a fixed orifice 28, and passage 29. Passage 30 connects the fluid to a pressure sensing device. A similar arrangement (not shown) communicates with passageway 26.

The permanent magnet 11 polarises the armature so that when the pole pieces are suitably energised through their respective coils, one repels one end of the armature and the other attracts the other. This causes a tilt of the armature through about five minutes of arc (a movement of about 0.0004 inch at the extreme end of the armature) so as to open the end of one of passageways 25, 26 while the other passageway remains closed. The pressure in the hydraulic line communicating with the open passageway is therefore reduced, while the pressure in the other hydraulic line remains as before. The consequent unbalance operates the second stage valve. The second stage valve is thereby moved in a direction dependent on the direction of the polarisation of the pole pieces.

In order to create a feedback signal related to the movement of the second stage valve, the armature has a wire 31 with one end bonded therein and the other end free extending from the armature to engage the spool of the second stage valve. When the armature tilts, the spool of the second stage valve (not shown) is displaced and exerts a torque through the wire on the armature 13 opposite to the tilting motion.

Figure 5:
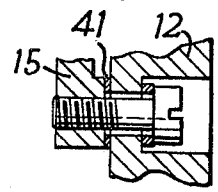
FIGURE 5 is a detail of part of the armature mounting of the stage of FIGURE 1.

The assembly of the first stage valve has to be made with considerable accuracy to obtain the correct air gap with the barrier 12 while the passageways 25, 26 are properly sealed. Moreover, it is desirable that the tilting motion of the armature be opposed by a torsional resistance as it is found that this leads to a greater stability of the valve, particularly at high temperature where the viscosity of the hydraulic fluid is reduced. Accordingly the armature base 15 is formed integrally with two lateral arms 33, 34 extending in opposite directions as seen best in FIGURE 3. These arms are drilled and tapped to take screws mounting the armature on the barrier 12; shims 41 being used to set the air gap as shown in the detail of FIGURE 5. Each arm is reduced in cross-section at 36, 37 respectively, the reduced areas being aligned along a line coincident with the tilt axis so that when tilting of the armature occurs, both the arms are twisted and act as torsion bars, a torsional resistance to the motion being set up. The torsional resistance is determined by the dimensions of the reduced areas which are chosen so as to give a preferred value of resistance.

In order to obtain a desired relationship of the parts, the armature air gap is first set by choosing the correct thickness of the shims 41 as described above.

The adjustable nozzles members 20, 21 are then adjusted by screwing into the respective pole pieces so that the pasageways 25, 26 are both substantially sealed with the armature in its central untilted position. This may be carried out by comparing the pressures in the supply lines associated with the passageways and adjusting the nozzles till the pressures are equal.

What is claimed is:

1. In an electrohydraulic servo valve, the combination comprising a permanent magnet, an armature located in the field of said permanent magnet having a north and south pole and a pair of oppositely extending torsionally resilient arms, a pair of electro magnets one located adjacent each of the poles of the armature, energising means selectively energising the electro magnets, a nonmagnetic barrier member between the permanent magnet and the armature arms, distance pieces sandwiched between the armature arms and the barrier member, and means rigidly securing the arms, distance pieces and barrier members.

2. In an electrohydraulic servo valve of the character recited in claim 1, the combination further comprising a pair of nozzle members one located within each electro magnet and each having a nozzle opening adjacent the armature.

References Cited

UNITED STATES PATENTS

| 2,823,689 | 2/1958 | Healy | 137—82 |
| 2,853,090 | 9/1958 | Hanna et al. | 137—82 |
| 2,977,985 | 4/1961 | Ericson et al. | 137—625.61 |
| 3,128,750 | 4/1964 | Schmidt | 137—85 XR |
| 3,379,214 | 4/1968 | Weinberg | 251—65 XR |

HENRY T. KLINKSIEK, Primary Examiner

U.S. Cl. X.R.

137—85, 625.61; 335—276